2,995,518
PREPARATION OF FERRITES OF HIGH INITIAL PERMEABILITY AND PRODUCTS OBTAINED

Charles Louis Guillaud, Bellevue, Gérard René Villers, Versailles, and Max Pierre Paulus, Paris France, assignors to Centre National de la Recherche Scientifique, Paris, France, a corporation of France
No Drawing. Filed Oct. 18, 1957, Ser. No. 690,902
Claims priority, application France Oct. 29, 1956
3 Claims. (Cl. 252—62.5)

Certain high permeability ferrites are already known, in particular a nickel-zinc ferrite mentioned by Snoek in his book "A New Development in Ferromagnetic Materials" has an initial permeability of 3,800, but this permeability, although high, is still insufficient for many purposes.

Object of the present invention is a combination of means which make it possible, taken either separately or together, to increase the initial permeability of all the ferrites of nickel-zinc and to obtain for certain of them an initial permeability higher than 5,000.

It also has as its object, materials similar to those obtained by the application of the above-mentioned means.

The invention has the following essential characteristics either separately or together:

(1) A quantity of lithium comprised between 0.04% and 1.50% mol., and preferably between 0.2% and 0.8% mol. is introduced into the ferrite. This addition permits an increase of the initial permeability in relation to the ferrite of the same composition, but not containing lithium, which increase may exceed 30%.

(2) The granular structure of the ferrite is homogeneous and such that the crystallites or "grains" have dimensions comprised between 2 and 20 microns. The cavities or holes of this granular structure being situated as much as possible on the grain boundaries and not inside the grains.

(3) The content by weight of barium and strontium must not exceed 0.1% of the total weight of the mixture.

(4) The content of $Fe_2O_3$ must be comprised between 49.7 and 50.3% mol., the content of FeO being practically zero.

The lithium can be introduced in the mixture either in the form of salt which is transformed into oxide under the influence of heat, or directly in the form of oxide. It may also, for example, be coprecipitated with one or more of the components of the mixture.

With regard to the granular structure of the ferrite, the latter is conditioned in particular by the heat treatments. The size of the grains depends, among other things, on the temperature and time of heating. Generally speaking, the "grains" are all the larger, the higher the temperature of preparation and the longer the time of annealing. For a predetermined lot of oxides the temperature and the time of preparation must be determined by experiment.

The invention also consists in obtaining as homogeneous as possible a structure, that is to say, a structure of which the grains are very similar in size. Moreover, the existence of cavities inside the crystallites has the effect of reducing the initial permeability and increasing the losses. The applicant has pointed out that the cavities were formed particularly in grains of which the largest dimension was higher than 20 microns.

The content of $Fe_2O_3$ has a very great influence on the value of the initial permeability; for example, for a variation of 0.1% of the content of $Fe_2O_3$ in approximately stoichiometric proportions, it is possible to observe differences of permeability of the order of 1,000. It is therefore necessary not only to know, with great accuracy, the composition of the mixture before grinding, but also to take into consideration the contribution of iron due to the mill.

The following non-limitative examples will permit a better understanding of the invention:

Example I

A mixture of oxides is made by introducing into a steel ball-mill oxides of iron $Fe_2O_3$, of nickel NiO and zinc ZnO, of which the respective molecular proportions are 49.7–15.5–34.8%; the iron introduced by the mill corresponds to an increase of the content of $Fe_2O_3$ of 0.3% mol. (the same is true in the examples which follow). The oxides employed contain less than 0.1% by weight of any impurities whatsoever. After grinding, pressing and heat treatment at 1,250° C. for four hours in an oxygen atmosphere, the product obtained has an initial permeability of 4,200. The average dimension of the grains is about 12 microns.

Example II

Carrying out the same heat treatment as in Example I on a pressed mixture of the same composition of $Fe_2O_3$, NiO and ZnO as in Example I, but containing 0.25% mol of $Li_2O$, the initial permeability is then 5,500.

Example III

Starting with a pressed mixture of the same composition as that of Example I, the heat treatment is carried out at 1,300° C. for 4 hours in oxygen, the initial permeability is then 5,700, and the dimension of the grains about 17 microns.

Example IV

If the pressed mixture of Example I is treated for 4 hours at 1,350° C., the permeability is not more than 3,500, the grains then have a dimension of 25 microns, but more than 80% of them have cavities inside the grains.

Example V

A mixture and a heat treatment are carried out as in Example I, but the molecular proportions before grinding of $Fe_2O_3$, NiO and ZnO are respectively 50.1–15.5 and 34.4% mol., the initial permeability is not more than 2,500.

Example VI

Starting with an initial mixture before grinding containing in molecular proportions 49.7% of $Fe_2O_3$, 20% mol. of NiO and the rest ZnO. After heat treatment of 1,250° C. for 3½ hours, the initial permeability is 1,700.

Example VII

With the same mixture as that of Example VI, but to which 0.30% mol. of $Li_2O$ has been added and after heat treatment identical with that of Example VI, the initial permeability is 2,100.

Example VIII

If 0.2% by weight of barium is added to mixture I in the form of $CO_3Ba$, and if it is subjected to a heat treatment identical with that of Example I, the initial permeability of the material thus formed is not more than 1,200.

What we claim is:

1. A ferromagnetic ferrite prepared by mixing 49.7 to 50.3 mol. percent of $Fe_2O_3$, 15 to 20 mol. percent NiO, and .02 to .8 mol. percent lithium oxide and the remainder ZnO and less than .1 mol. percent impurities, pressing and heat treating said mixture in an oxygen atmosphere at a temperature and for a period of time such that the grain size of the finished ferrite is between 5 and 20 microns, whereby the permeability of the ferrite is increased over that obtained by a similar mixture omitting the lithium oxide.

2. Ferromagnetic ferrite having initial permeability greater than 5000, consisting essentially of 49.7 mol. percent ferric oxide, 15.5 mol. percent nickel oxide, 0.25 mol. percent lithium oxide, and the remainder zinc oxide, the impurities being less than 0.1% by weight and having a mean dimension of the grains of less than 20 microns.

3. Ferromagnetic ferrite consisting essentially of 49.7 mol. percent ferric oxide, 20 mol. percent nickel oxide, 0.3 mol. percent of lithium oxide and the remainder zinc oxide, the impurities being less than 0.1% by weight and having a mean dimension of the grains of less than 20 microns.

References Cited in the file of this patent

UNITED STATES PATENTS

| | | |
|---|---|---|
| 2,549,089 | Hegyi | Apr. 17, 1951 |
| 2,565,861 | Leverenz et al. | Aug. 28, 1951 |
| 2,734,034 | Crowley | Feb. 7, 1956 |
| 2,736,708 | Crowley et al. | Feb. 28, 1956 |
| 2,773,039 | Schoenberg | Dec. 4, 1956 |

FOREIGN PATENTS

| | | |
|---|---|---|
| 521,341 | Belgium | Jan. 9, 1954 |

OTHER REFERENCES

Harvey et al.: RCA Review, September 1950, pp. 344–362.

Weisz: Ceramic Industry, April 1952, pp. 130, 131, 134; May 1952, pp. 76–78.